United States Patent
Sanchez, Jr.

(10) Patent No.: US 8,939,433 B2
(45) Date of Patent: Jan. 27, 2015

(54) KEY FOR GAS CYLINDERS

(76) Inventor: Osvaldo Sanchez, Jr., Brooklyn, NY (US)

(*) Notice: Subject to any disclaimer, the term of this patent is extended or adjusted under 35 U.S.C. 154(b) by 0 days.

(21) Appl. No.: 13/555,380

(22) Filed: Jul. 23, 2012

(65) Prior Publication Data

US 2014/0021393 A1      Jan. 23, 2014

(51) Int. Cl.
*F16K 31/00* (2006.01)

(52) U.S. Cl.
USPC ........................................................ 251/292

(58) Field of Classification Search
USPC .......................................... 251/291, 292, 293
See application file for complete search history.

(56) References Cited

U.S. PATENT DOCUMENTS

| | | | |
|---|---|---|---|
| 1,167,242 A | | 1/1916 | Wright |
| 2,834,369 A | * | 5/1958 | Wheeler ........................ 137/360 |
| 3,175,435 A | | 3/1965 | Pollack |
| 4,554,944 A | | 11/1985 | Daghe et al. |
| 4,871,144 A | | 10/1989 | Kaniaris |
| 6,076,435 A | | 6/2000 | White, Sr. et al. |
| 6,450,069 B1 | | 9/2002 | Brahmbhatt |
| 6,899,001 B1 | | 5/2005 | Sanders et al. |
| D611,787 S | | 3/2010 | Knapp |
| 8,087,639 B1 | * | 1/2012 | Knapp .......................... 251/235 |
| 2007/0164040 A1 | | 7/2007 | DeRosier et al. |
| 2010/0122419 A1 | | 5/2010 | Zupancic-Albin |

FOREIGN PATENT DOCUMENTS

| | | |
|---|---|---|
| CZ | 967944 A1 | 10/1982 |
| EP | 1195473 A1 | 7/2001 |

* cited by examiner

*Primary Examiner* — John K Fristoe, Jr.
*Assistant Examiner* — Kevin E Lynn
(74) *Attorney, Agent, or Firm* — JP Webb; Jason P. Webb; Danny y. H Cheng

(57) ABSTRACT

There is a key for use with pressurized gas cylinders. The key includes a sleeve configured to fit over a lever arm of a gas cylinder. The key includes a handle extending from the sleeve, and having a body. The handle includes a first slot and a second slot extending through the body of the handle and configured to fit over a valve toggle of a gas cylinder. The handle includes a washer storage device extending substantially orthogonally from the body of the handle. The handle includes a flange coupled to an end of the washer storage device, opposite the body. The handle also includes a recess portion disposed about a base of the washer storage device of the handle and sized and shaped to receive a plurality of gas cylinder washers.

16 Claims, 4 Drawing Sheets

KEY FOR GAS CYLINDERS

BACKGROUND OF THE INVENTION

1. Field of the Invention

The present invention relates to tools, specifically to a key for gas cylinders.

2. Description of the Related Art

A gas cylinder is a pressure vessel used to store gases at above atmospheric pressure. High pressure gas cylinders are also called bottles. Although they are sometimes colloquially called "tanks", this is technically incorrect, as a tank is a vessel used to store liquids at ambient pressure and often has an open top. An oxygen tank is a storage vessel for oxygen, which is either held under pressure in gas cylinders or as liquid oxygen in a cryogenic storage tank.

Oxygen tanks are used to store gas for: industrial processes including the manufacture of steel and monel; oxyacetylene welding equipment and some gas cutting torches; use as the liquid rocket propellants for rocket engines; medical breathing gas at medical facilities and at home; breathing at altitude in aviation, either in an uncontrolled decompression emergency, or constantly (in the case of unpressurized aircraft); oxygen first aid kits; gas blending for creating diving breathing mixes such as nitrox, trimix and heliox; open-circuit scuba sets—mainly used for accelerated decompression in technical diving; some types of diving rebreather: and oxygen rebreathers and fully closed circuit rebreathers.

When gases are supplied in gas cylinders, the cylinders have a stop angle valve at the end on top. Often, gas cylinders are somewhat long and narrow and may stand upright on a flattened bottom at one end with the valve at the top. During storage, transportation, and handling when the gas is not in use, a cap may be screwed over the protruding valve to protect it from damage or breaking off in case the cylinder were to fall over. Instead of a cap, cylinders commonly have a protective collar or neck ring around the service valve assembly.

When the gas in the cylinder is ready to be used, the cap is taken off and a pressure-regulating assembly is attached to the stop valve. This attachment typically has a pressure regulator with upstream (inlet) and downstream (outlet) pressure gauges and a further downstream needle valve and outlet connection. For gases that remain gaseous under ambient storage conditions, the upstream pressure gauge can be used to estimate how much gas is left in the cylinder according to pressure. For gases that are liquid under storage, e.g., propane, the outlet pressure is dependent on the vapor pressure of the gas, and does not fall until the cylinder is nearly exhausted. The regulator could be adjusted to control the flow of gas out of the cylinder according to pressure shown by the downstream gauge. The outlet connection is attached to whatever needs the gas supply, such as a balloon for example.

The valves on industrial, medical and diving cylinders are usually of different size and type, as are the valves for different products, making it more difficult to mistakenly misuse a gas. Some fittings use a right-hand thread, while others use a left-hand thread; left-hand thread fittings are usually identifiable by notches cut into them.

Some improvements have been made in the field. Examples of references related to the present invention are described below in their own words, and the supporting teachings of each reference are incorporated by reference herein:

U.S. Pat. No. 8,087,639, issued to Knapp, discloses an oxygen tank key includes an elongated substantially thin flat handle portion defining a first plane and having first and second ends that define the length thereof and first and second side edges that define the width. A socket, integrally formed with the handle portion between the two ends, has a thickness that is greater than the thickness of the handle portion. The socket includes an aperture that opens adjacent one of the side edges and has a depth extending substantially the width of the handle portion. The aperture has a substantially rectangular cross-section and is adapted to fit onto the rectangularly shaped end of an oxygen tank valve control stem. A slot passes through the handle and is elongated in the direction of the length of the handle. The slot includes champhered ends and is adapted to fit over the lever of a regulator for the oxygen tank to help release the regulator from the tank.

U.S. Pat. No. 6,899,001, issued to Sanders et al., discloses a multiple component wrench is adapted for use to attach and disconnect fire hose and hydrant coupling using this singular tool in lieu of several tools currently used by firefighters. The wrench has a sliding portion and a receiver portion presented as one tool, yet allowing multiple wrenches adapted for use on Storz and spanner hose couplings, rocker lug couplings, water meter shutoff valves, gas cock valves, pentagonal nuts and square nuts, and includes a multiple ratchet mechanism with multiple removable ratchets adapted to a variety of different nuts encountered on the multiple hydrants installed in various municipalities. The wrench is also extendable to provide additional leverage during use, the wrench further capable of separation forming two independent wrenches.

U.S. Pat. No. 6,450,069, issued to Brahmbhatt, discloses a multi-purpose wrench (10) used to open valves (V) on gas cylinders of various sizes. An elongate handle (12) has a ratchet formed at one end (12a). A socket (14) mounts on the ratchet and has a plurality of openings (20a,22a, 20b,22b) formed on opposite surfaces (18a, 18b) for engaging the stem of a valve (V3, V4) to open and close the valve. A disc (26) is attached to a ratchet (24) adjacent the other end of the handle to open gas cylinders of a different size. The disc includes a plurality of pins (28) which engage differently shaped wheels of valves (V1, V2) the wrench to open the valve when rotated.

U.S. Pat. No. 6,076,435, issued to White Sr. et al., discloses a tool for multiple purposes including turning valve wheels, opening drum plugs and vents, driving sockets, turning screws, use as a drift pin and prying, among other possible uses, the tool having a handle and an exterior shank and an interior shank, each shank having a square cross section and being in a spaced relationship and parallel to one another located at one end of the handle, the opposite end of the handle having an edge and the handle being tapered, the interior shank which is located furthest from the end of the handle having an outer end with a reduced size set off center so that the wall of that shank toward the edge is aligned along the entire interior shank.

U.S. Patent Application Publication No.: 2010/0122419, by Zupancic-Albin, discloses a multi-function tool designed for the needs of healthcare professionals. The multi-tool may include individual tools that a healthcare professional uses on a regular basis, including a gas cylinder wrench, an integrated pill slicer, a set of EKG calipers, a sharp/dull neurological response tester, and a gripping device for I.V. caps. Additional features may include a penlight or laser pointer and a fold out ruler. A tool carrier includes features that healthcare professionals also regularly use, such as a tape roll holder and dispenser and retractable ring for keys and security badges.

The inventions heretofore known suffer from a number of disadvantages which include being ineffective, being inefficient, being difficult to use, being limited in use, being limited in functionality, failing to provide universal access to a plurality of gas cylinders/tanks, failing to assist a user where a washer/o-ring is missing, requiring multiple tools, making life difficult for those in compromised health situations, and requiring too much hand strength, especially from children and the elderly.

What is needed is a gas cylinder key that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available gas cylinder keys. Accordingly, the present invention has been developed to provide an effective and efficient gas cylinder key.

According to one embodiment of the invention, there is a key for use with pressurized gas cylinders. The key may include a sleeve that may be configured to fit over a lever arm of a gas cylinder. The sleeve may include a cylindrical interior cavity that may be configured to fit over a lever arm of a gas cylinder. The key may include a handle that may be extending from the sleeve. The sleeve and the handle may be co-linear in configuration.

The handle may include a body. The handle may include a first slot that may be extending through the body of the handle and may be configured to fit over a valve toggle of a gas cylinder. The first slot may include a rectangular configuration that may be sized and shaped to receive a valve toggle of a gas cylinder. The handle may include a second slot that may be extending through the body of the handle, and may be positioned perpendicularly relative the slot. The second slot may be configured to fit over a valve toggle of a gas cylinder. The second slot may include a rectangular configuration that may be sized and shaped to receive a valve toggle of a gas cylinder. The handle may include a washer storage device that may be extending substantially orthogonally from the body of the handle. The handle may include a flange that may be coupled to an end of the washer storage device, opposite the body. The handle may also include a recess portion that may be disposed about a base of the washer storage device of the handle and may be sized and shaped to receive a plurality of gas cylinder washers.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which.

DETAILED DESCRIPTION OF THE INVENTION

Figure 1:
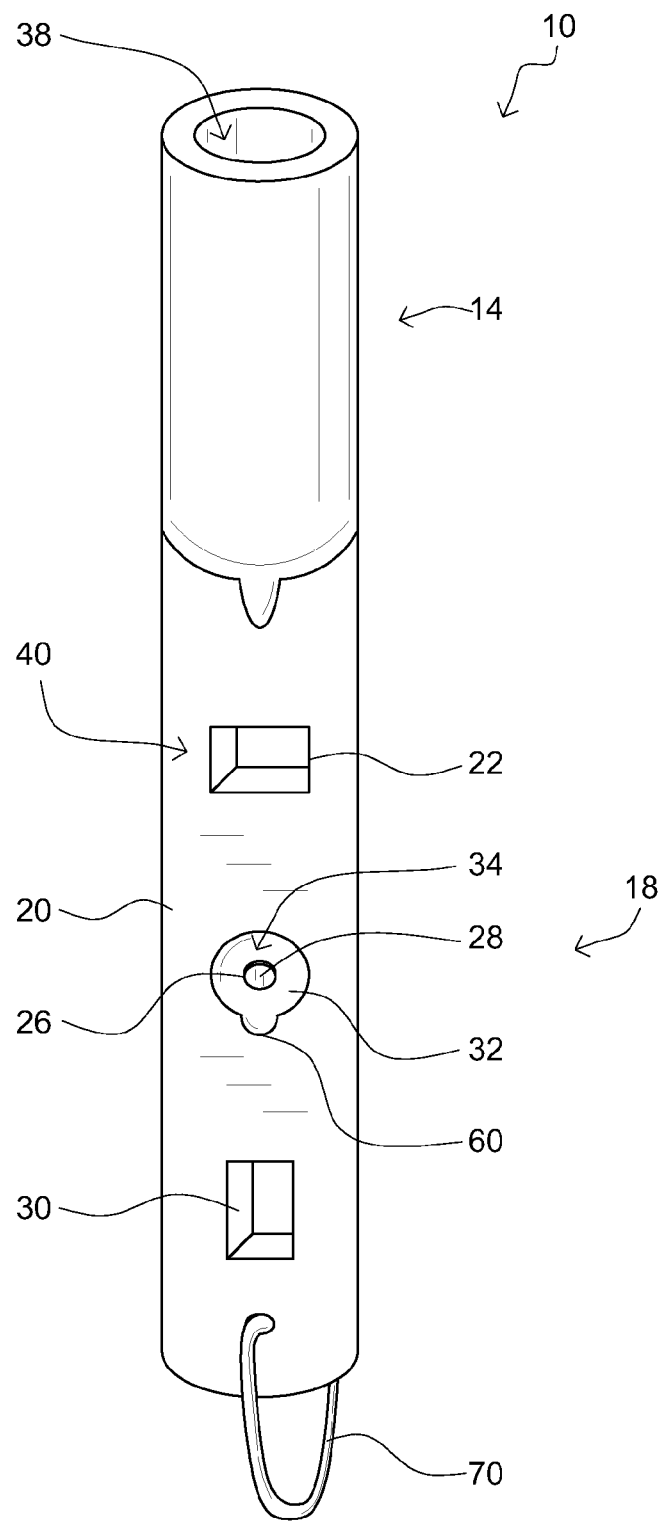
FIG. 1 is a top perspective view of a key for gas cylinders, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising"

is to be interpreted as including the more restrictive terms "consisting of" and "consisting essentially of."

FIG. 1 is a top perspective view of a key for gas cylinders, according to one embodiment of the invention. There is shown a key 10 including a sleeve 14 and a handle having a body 20, a slot, 22, a post 26, and a flange 28.

The illustrated key 10 is configured to be used to open and close a lever arm or a valve toggle of a gas cylinder. The key 10 includes a sleeve 14 configured to fit over a lever arm of a gas cylinder, wherein the key 10 is configured to assist in manual horizontal rotation of a lever arm of a gas cylinder, thereby either opening or closing a pathway into a gas cylinder. The sleeve 14 includes a cylindrical interior cavity 38 configured to fit over a lever arm of a gas cylinder. The cylindrical interior cavity 38 is sized and shaped to be substantially larger than a lever arm of a gas cylinder such that the lever arm may fit inside thereof. The cylindrical interior cavity 38 is configured to encompass a lever arm of a gas cylinder.

The illustrated key 10 includes a handle 18 extending from the sleeve 14. The illustrated sleeve 14 and handle 18 are co-linear in configuration. The handle 18 includes a body 20, wherein the body 20 is configured to extend from the sleeve 14 and configured to support the components of the key 10. The handle 18 includes an attachment member 70 configured to be disposed through the body 20. The illustrated attachment member 70 is an attachment ring configured to selectably couple to a user. The attachment member may be, but not limited to: a ring, a hook and loop attachment device, Velcro, magnets, adhesive, snap, hooks, loops, buttons, etc. and still perform its intended function.

The handle 18 includes a slot 22 extending through the body 20 of the handle 18 and configured to fit over a valve toggle of a gas cylinder. The slot 22 includes a rectangular configuration 40 sized and shaped to receive a valve toggle of a gas cylinder. The slot 22 is configured to assist in horizontal rotation of a valve toggle of a gas cylinder. The slot 22 is generally sized and/or shaped slightly larger than a valve toggle of a gas cylinder. Such a slot will generally extend completely through the body of the key, thereby making it accessible from either side and/or facilitating visibility of the key and toggle mating during use. However, it is possible for the slot to not extend completely through the body and still perform its intended function. Further, the slot may include other or surrounding structure that alters the visual appearance of the slot so that it does not appear as a slot but still functions the same in that it will mate with the toggle and facilitate the turning thereof.

The illustrated handle 18 includes a second slot 30 extending through the body 20 of the handle 18. The illustrated second slot 30 is positioned perpendicularly relative the slot 22. The second slot 30 is configured to provide a keyed tool that is at a perpendicular angle relative to the positioning of the first slot 22, thereby providing another angle to engage a valve toggle of a gas cylinder. The second slot 30 is configured to fit over a valve toggle of a gas cylinder. The second slot 30 includes a rectangular configuration sized and shaped to receive a valve toggle of a gas cylinder. The second slot 30 is generally sized and/or shaped slightly larger than a valve toggle of a gas cylinder.

The illustrated handle 18 includes a post 26 or a washer/o-ring/accessory storage device extending substantially orthogonally from the body 20 of the handle 18. The post 26 is configured to support a plurality gas cylinder washers or o-rings therethrough. The post 26 is configured to be generally sized and/or shaped slightly smaller than an aperture of a gas cylinder washer. The handle 18 includes a flange 28 coupled to an end of the post 26, opposite the body 20. The flange is sized and shaped to be slightly larger in circumference than the post 26. The handle 18 also includes a recess portion 32 disposed about a base 34 of the post 26 of the handle 18. The recess portion 32 is sized and shaped to receive a plurality of gas cylinder washers provide storage space therefor, and support them therein. The recess portion 32 is generally sized and/or shaped slightly larger in circumference than a gas cylinder. The recess portion 32 includes a depth configured to receive a plurality of gas cylinder washers. The recess portion 32 includes a sloped protrusion 60 configured to provide a sloped surface from an exterior surface of the handle 18 down to the base 34 of the post 26. The sloped protrusion 60 is configured to provide access to the washer/o-ring/accessory disposed within the recess portion 32.

In one non-limiting example, there is a key for gas cylinders that solves the problem of having oxygen tanks with different interfaces/toggles for opening and closing thereof that are difficult for people to use. End users often have a difficult time working with gas cylinders and especially with medical oxygen tanks, as such are generally used by people in compromised health situations. Further, the key includes storage space for washers/o-rings that are used in association with the gas cylinders. It is often not possible to utilize a gas cylinder with a missing o-ring or washer and therefore it is very helpful, especially in medical situations, to have a convenient place to store spares. Such a key may have a sleeve for use with arm-shaped toggles and have a slot or other keyed aperture for use with slot-shaped or other toggles that are mere protrusions.

In another non-limiting example, there is a gas cylinder key that goes over/fits existing toggles and allows you to turn their valves, thereby opening and closing the gas cylinders as needed for the use thereof. There is also a spare washer/o-ring storage structure that is out of the way of the operation of the toggle interfaces (sleeve, slot, etc.) but conveniently associated with the key. Such a key may include light-weight materials such as but not limited to plastic. A sleeve thereon may be cylindrical and/or may fit over an arm-like toggle to be used like a cheater-bar. There may be rectangular slots that may be used with tanks that use post toggles that are shaped rectangularly. There may be one or more apertures through the key that may be configured for use with an attachment device (string, clamp, hook, clip, etc.) for coupling the key to something else.

Figure 2:
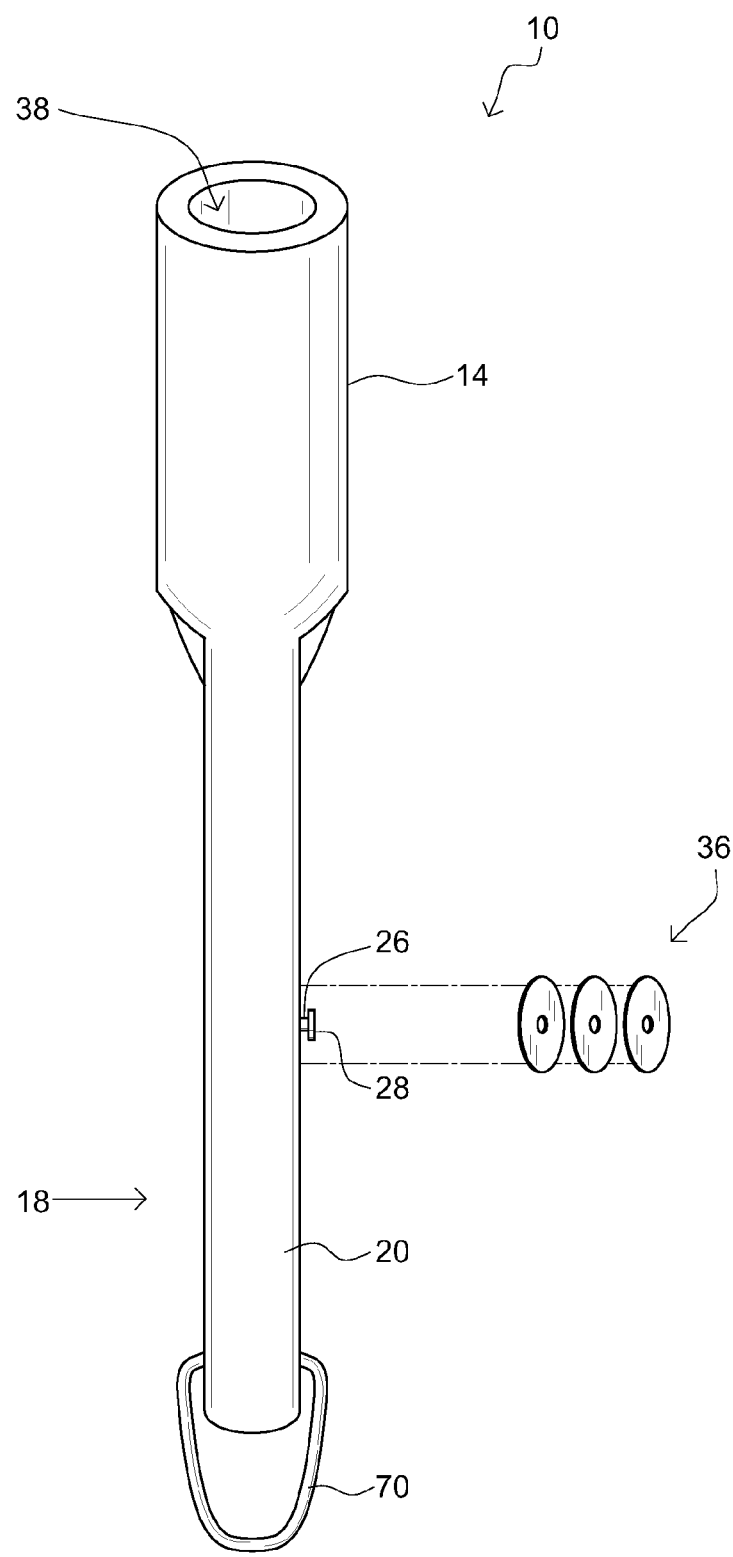
FIG. 2 is a side perspective view of a key for gas cylinders, according to one embodiment of the invention.

FIG. 2 is a side perspective view of a key for gas cylinders, according to one embodiment of the invention. There is shown a key 10 includes a sleeve 14 and a handle 18 having a body 20, a washer storage device 26, and a flange 28.

The illustrated key 10 is configured to open and close a valve of a pressurized gas cylinder. The key 10 includes a sleeve 14 having a cylindrical interior cavity 38 configured to fit over a lever arm of a gas cylinder. The key 10 includes a handle 18 that extends from the sleeve 14 in a co-linear configuration. One skilled in the art would appreciate that the handle and the sleeve may also be non-linear in configuration, wherein the handle couples to the sleeve about an angle.

The handle 18 includes a body 20 having a washer storage device 26 extending substantially orthogonally from the body 20 of the handle 18. The washer storage device 26 is configured to store and secure a plurality of gas cylinder washers 36 thereto. The washer storage device 26 is a post, wherein the post includes a post circumference smaller than an aperture of a gas cylinder. The plurality of washers 36 are configured to be disposed through the washer storage device 26 and selectably couple thereto.

The handle 18 includes a flange 28 coupled to an end of the washer storage device 26, opposite the body 20. The flange 28 includes a circumference slightly smaller than an aperture of a gas cylinder washer, however larger than a post circumference of the washer storage device, thereby creating a lip configured to secure the plurality of gas cylinder washers thereto.

Figure 3:
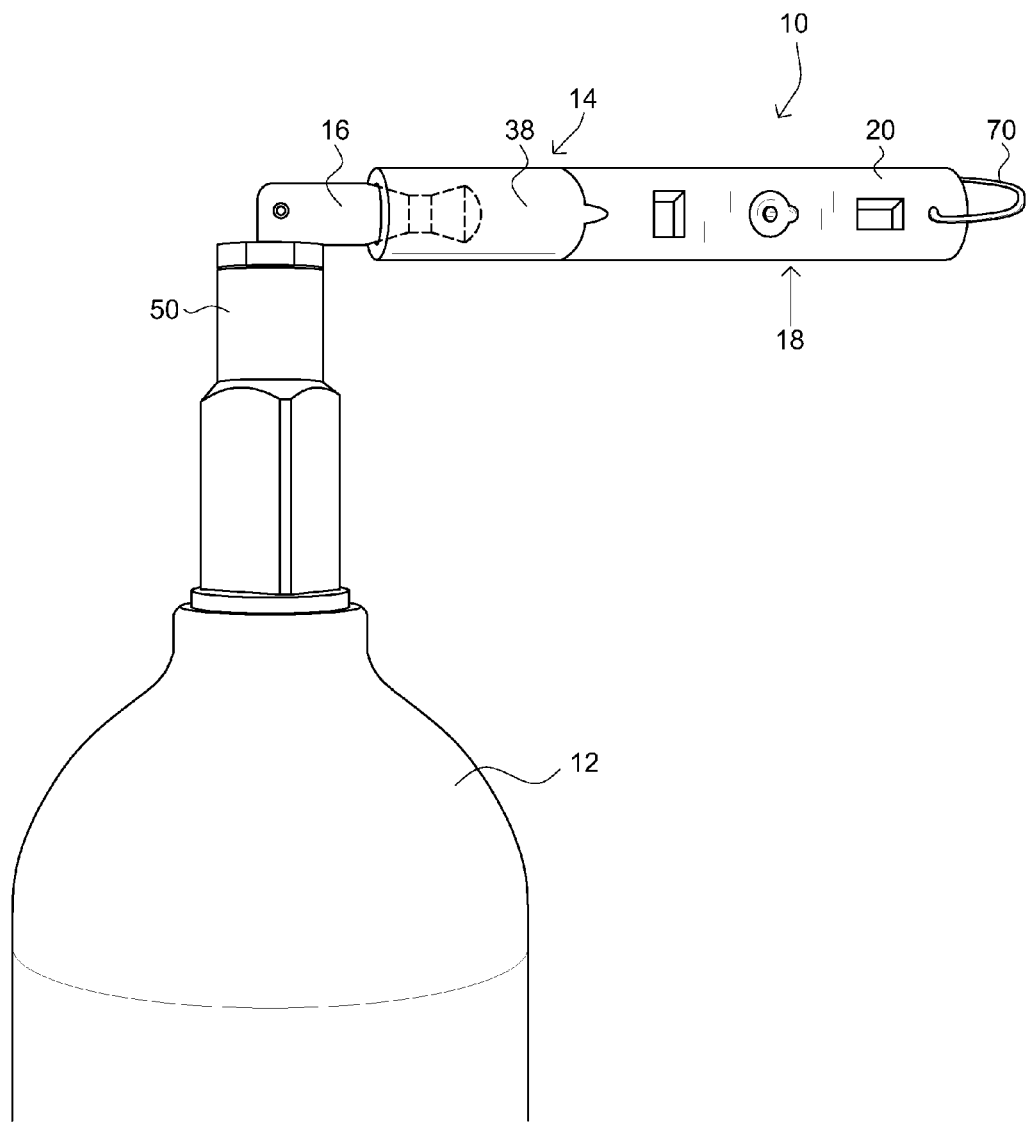
FIG. 3 is a perspective view of a key for gas cylinders in use, according to one embodiment of the invention.

FIG. 3 is a perspective view of a key for gas cylinders in use, according to one embodiment of the invention. There is shown a key 10 disposed about a lever arm 16 of a gas cylinder 12.

The illustrated key 10 is configured for use with pressurized gas cylinders, such as opening and closing a valve or lever arm of a gas cylinder. The key 10 includes a sleeve 14 having a cylindrical interior cavity 38 configured to fit over a lever arm 16 of a gas cylinder 12. The cylindrical interior cavity includes an interior circumference larger than the lever arm 16, wherein the lever arm 16 is configured to be disposed therein. The interior walls of the cylindrical interior cavity is configured to contact the lever arm 16 and assist in horizontal rotation of the lever arm 16, thereby opening or closing a valve of the gas cylinder 12. The key 10 includes a handle 18 having a body 20. The handle 18 is configured to provide a grip for a user to rotate the sleeve 14 and the lever arm 16 on a horizontal axis, thereby opening or closing a valve 50 of the gas cylinder 12.

Figure 4:
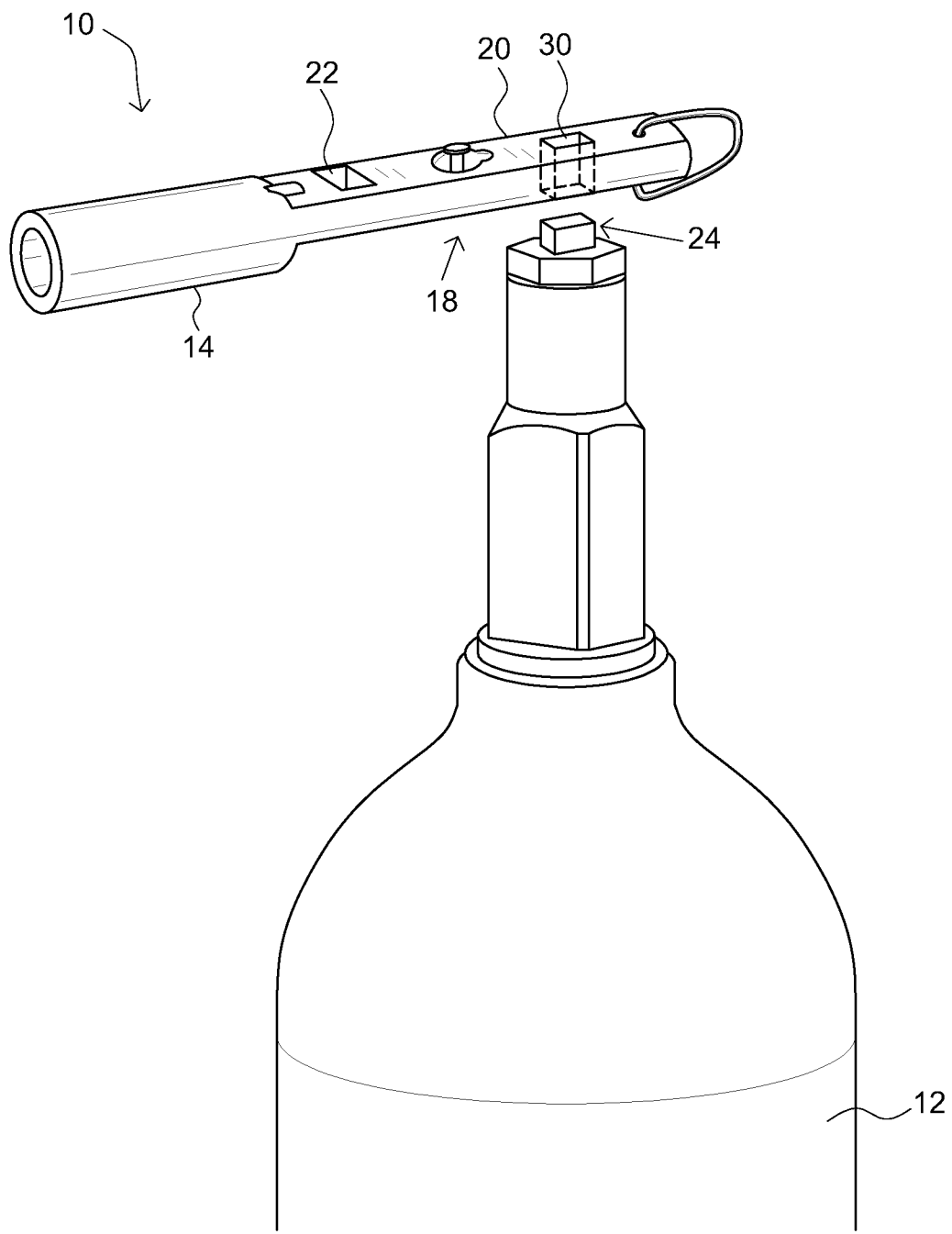
FIG. 4 is a perspective view of a key for gas cylinders in use, according to one embodiment of the invention.

FIG. 4 is a perspective view of a key for gas cylinders in use, according to one embodiment of the invention. There is shown a key 10 disposed about a toggle valve 24 of a gas cylinder 12.

The illustrated key 10 is configured for use with pressurized gas cylinders, such as coupling or uncoupling a valve to a gas cylinder 12. The key 10 includes a handle 18 extending from a sleeve 14 in a co-linear configuration; and having a body 20. The handle 18 includes a first slot 22 extending through the body 20 of the handle 18 and is configured to fit over a valve toggle 24 of the gas cylinder 12. The first slot 22 includes a rectangular configuration sized and shaped to receive the valve toggle 24 of the gas cylinder 12. The first slot 22 is sized and shaped to be slightly larger than the exterior area of the valve toggle 24. The first slot 22 is configured to contact all four exterior side walls of the valve toggle 24, thereby assisting in horizontal rotation of the valve toggle 24.

The handle 18 includes a second slot 30 extending through the body 20 of the handle 18. The illustrated second slot 30 is positioned perpendicularly relative the first slot 22. The second slot 30 is configured to fit over a valve toggle 24 of a gas cylinder 12. The second slot 30 also includes a rectangular configuration sized and shaped to receive the valve toggle 24 therethrough. The second slot 30 is sized and shaped to be slightly larger than the exterior area of the valve toggle 24. The second slot 30 is configured to contact all four exterior side walls of the valve toggle 24, thereby assisting in horizontal rotation of the valve toggle 24.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the figures illustrate specific relative locations and orientations of described functional parts of the key, it is understood that varying embodiments may have varying locations and/or orientations of the described functional parts and that additional parts may generally be included in some embodiments as well.

Additionally, although the figures illustrate a cylindrical sleeve, it is understood that the sleeve may not be perfectly cylindrical or may even be irregularly shaped in various embodiments. The illustrated rectangular slots may also be of varying shape so long as they function to facilitate turning an appropriate toggle.

It is also envisioned that there may be a plurality of storage posts for the washers/o-rings/etc. (and other accessories) that may be coupled to and/or extending from various portions of the key.

It is expected that there could be numerous variations of the design of this invention. An example is that the storage post(s) may have a different structure for coupling to or otherwise securing accessories to the key, such as but not limited to clips, snaps, hooks, adhesive, casings, notches, and the like and combinations thereof.

Finally, it is envisioned that the components of the device may be constructed of a variety of materials, including but not limited to plastic, resin, rubber, metal, ceramic, woven fibers, and the like and combinations thereof.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. A key for use with pressurized gas cylinders, comprising:
    a) a sleeve configured to fit over a lever arm of a gas cylinder;
    b) a handle extending from the sleeve and including:
        b1) a body;
        b2) a slot extending through the body of the handle and configured to fit over a valve toggle of a gas cylinder;
        b3) a post extending substantially orthogonally from the body of the handle; and
        b4) a flange coupled to an end of the post, opposite the body; and
    wherein the sleeve is a cylindrical body co-linear with the body including a cylindrical cavity oriented co-linear with the body with an aperture facing out of a distal end of the key.

2. The key of claim 1, further comprising a second slot extending through the body of the handle, and configured to fit over a valve toggle of a gas cylinder.

3. The key of claim 2, wherein the second slot includes a rectangular configuration sized and shaped to receive a valve toggle of a gas cylinder.

4. The key of claim 2, wherein the second slot is positioned perpendicularly relative the position of the slot of the handle.

5. The key of claim 1, further comprising a recess portion disposed about a base of the post of the handle and sized and shaped to receive a plurality of gas cylinder washers.

6. The key of claim 1, wherein the sleeve includes a cylindrical interior cavity configured to fit over a lever arm of a gas cylinder.

7. The key of claim 1, wherein the slot includes a rectangular configuration sized and shaped to receive a valve toggle of a gas cylinder.

8. The key of claim 1, wherein the sleeve and the handle are co-linear in configuration.

9. A key for use with pressurized gas cylinders, consisting essentially of:
   a) a sleeve configured to fit over a lever arm of a gas cylinder; and
   b) a handle extending from the sleeve and including:
      b1) a body;
      b2) a first slot extending through the body of the handle and configured to fit over a valve toggle of a gas cylinder;
      b3) a second slot extending through the body of the handle, configured to fit over a valve toggle of a gas cylinder;
      b4) a washer storage device extending substantially orthogonally from the body of the handle;
      b5) a flange coupled to an end of the washer storage device, opposite the body; and
      b6) an o-ring disposed about the post between the flange and the body, wherein the o-ring has an inner diameter smaller than the diameter of the flange.

10. The key of claim 9, further comprising a recess portion disposed about a base of the washer storage device of the handle and sized and shaped to receive a plurality of gas cylinder washers.

11. The key of claim 10, wherein the sleeve includes a cylindrical interior cavity configured to fit over a lever arm of a gas cylinder.

12. The key of claim 11, wherein the first slot includes a rectangular configuration sized and shaped to receive a valve toggle of a gas cylinder.

13. The key of claim 12, wherein the second slot includes a rectangular configuration sized and shaped to receive a valve toggle of a gas cylinder.

14. The key of claim 13, wherein the second slot is positioned perpendicularly relative the position of the first slot of the handle.

15. The key of claim 14, wherein the sleeve and the handle are co-linear in configuration.

16. A key for use with pressurized gas cylinders, comprising:
   a) a sleeve configured to fit over a lever arm of a gas cylinder; wherein the sleeve includes a cylindrical interior cavity configured to fit over a lever arm of a gas cylinder; and
   b) a handle extending from the sleeve and including:
      b1) a body; wherein the sleeve and the handle are co-linear in configuration; wherein the sleeve is a cylindrical body co-linear with the body including a cylindrical cavity oriented co-linear with the body with an aperture facing out of a distal end of the key;
      b2) a first slot extending through the body of the handle and configured to fit over a valve toggle of a gas cylinder; wherein the first slot includes a rectangular configuration sized and shaped to receive a valve toggle of a gas cylinder;
      b3) a second slot extending through the body of the handle, and positioned perpendicularly relative the first slot, configured to fit over a valve toggle of a gas cylinder; wherein the second slot includes a rectangular configuration sized and shaped to receive a valve toggle of a gas cylinder;
      b4) a washer storage device extending substantially orthogonally from the body of the handle;
      b5) a flange coupled to an end of the washer storage device, opposite the body; and
      b6) a recess portion disposed about a base of the washer storage device of the handle and sized and shaped to receive a plurality of gas cylinder washers.

* * * * *